(12) United States Patent
Huffer

(10) Patent No.: US 12,172,797 B2
(45) Date of Patent: Dec. 24, 2024

(54) MEMBRANE LID WITH INTEGRATED PEELABLE PORTION

(71) Applicant: Sonoco Development, Inc., Hartsville, SC (US)

(72) Inventor: Scott William Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 231 days.

(21) Appl. No.: 17/531,107

(22) Filed: Nov. 19, 2021

(65) Prior Publication Data

US 2022/0144486 A1 May 12, 2022

Related U.S. Application Data

(63) Continuation of application No. 15/807,200, filed on Nov. 8, 2017, now Pat. No. 11,225,355.

(51) Int. Cl.
*B65D 17/50* (2006.01)
*B32B 37/00* (2006.01)
(Continued)

(52) U.S. Cl.
CPC ........ *B65D 17/502* (2013.01); *B32B 37/0076* (2013.01); *B32B 38/0004* (2013.01);
(Continued)

(58) Field of Classification Search
CPC .... B65D 17/502; B65D 75/54; B65D 25/205; B65D 23/14; B65D 5/5226; B65D 5/4229;
(Continued)

(56) References Cited

U.S. PATENT DOCUMENTS

| 1,585,820 A | 5/1926 | Baum |
| 1,827,636 A * | 10/1931 | Ames ................. B65D 75/5844 229/203 |

(Continued)

FOREIGN PATENT DOCUMENTS

| CA | 2918375 A1 | 1/2015 |
| CN | 1558827 | 12/2004 |

(Continued)

OTHER PUBLICATIONS

Patent Translate of JP2013147269 used in rejection.. (Year: 2013).*
(Continued)

*Primary Examiner* — Lucas E. A. Palmer
(74) *Attorney, Agent, or Firm* — Nelson Mullins Riley & Scarborough LLP

(57) ABSTRACT

The present invention relates to a flexible membrane lid for a container comprising a top paper layer which is perforated to form a perimeter of at least one peelable portion and a bottom film layer. In some embodiments, the bottom film layer is partially adhered to the top paper layer, wherein the layers are not adhered within the perimeter of the peelable portion. In other embodiments, the layers are adhered with a pressure sensitive adhesive within the perimeter of the peelable portion and with a permanent adhesive in the remainder of the area between the top paper layer and bottom film layer. In other embodiments, the invention relates to a flexible membrane lid for a container comprising a top paper layer comprising a pull tab and a bottom film layer which is removably adhered to the top paper layer, wherein bottom film layer comprises a separate pull tab.

20 Claims, 14 Drawing Sheets

(51) Int. Cl.
| | |
|---|---|
| *B32B 38/00* | (2006.01) |
| *B65D 77/20* | (2006.01) |
| *B32B 38/04* | (2006.01) |
| *B65D 53/08* | (2006.01) |
| *B65D 85/72* | (2006.01) |

(52) U.S. Cl.
CPC ........ *B32B 38/0012* (2013.01); *B32B 38/145* (2013.01); *B65D 77/2032* (2013.01); *B32B 2038/047* (2013.01); *B32B 2317/12* (2013.01); *B32B 2435/02* (2013.01); *B65D 53/08* (2013.01); *B65D 77/2024* (2013.01); *B65D 85/72* (2013.01); *B65D 2203/00* (2013.01); *B65D 2517/0013* (2013.01)

(58) Field of Classification Search
CPC .............. B32B 37/0076; B32B 38/004; B32B 38/0012; B32B 38/145; B32B 2038/047; B32B 2317/12; B32B 2435/02
See application file for complete search history.

(56) References Cited

U.S. PATENT DOCUMENTS

| | | | |
|---|---|---|---|
| 2,085,879 A | 7/1937 | Trump | |
| 2,131,575 A | 9/1938 | Whipple | |
| 2,204,594 A | 6/1940 | Hogg | |
| 2,246,398 A | 6/1941 | Van Saun et al. | |
| 2,703,952 A | 3/1955 | Perriguey | |
| 2,861,735 A | 11/1958 | Faltin | |
| 2,952,395 A | 9/1960 | Spees | |
| 2,991,001 A | 7/1961 | Hughes | |
| 3,127,087 A | 3/1964 | Spees | |
| 3,202,271 A | 8/1965 | Douglas | |
| 3,239,097 A | 3/1966 | Bates et al. | |
| 3,259,303 A | 7/1966 | Repko | |
| 3,266,965 A | 8/1966 | Spees | |
| 3,279,331 A | 10/1966 | Platt | |
| 3,335,939 A | 8/1967 | Robinson, Jr. | |
| 3,942,640 A | 3/1976 | Hellstrom | |
| 3,946,872 A | 3/1976 | Sturm | |
| 3,964,670 A * | 6/1976 | Amneus ................ | B65D 17/502 |
| | | | 229/123.1 |
| 4,005,975 A | 2/1977 | Sollerud | |
| 4,023,292 A | 5/1977 | Shibata et al. | |
| 4,057,667 A * | 11/1977 | Wiggins .................. | B29C 48/21 |
| | | | 428/458 |
| 4,066,600 A | 1/1978 | Pletcher et al. | |
| 4,077,307 A * | 3/1978 | Davis, Jr. .......... | B29C 66/83513 |
| | | | 493/197 |
| 4,185,754 A | 1/1980 | Julius | |
| 4,264,662 A | 4/1981 | Taylor et al. | |
| 4,280,653 A | 7/1981 | Elias | |
| 4,301,640 A | 11/1981 | Haas | |
| 4,325,393 A | 4/1982 | Thomas | |
| 4,345,393 A | 8/1982 | Price et al. | |
| 4,353,460 A | 10/1982 | Kahn | |
| 4,372,460 A | 2/1983 | Brochman et al. | |
| 4,381,848 A * | 5/1983 | Kahn ................. | B65D 77/2044 |
| | | | 229/123.1 |
| 4,452,842 A | 6/1984 | Borges et al. | |
| 4,464,158 A | 8/1984 | Kardon | |
| 4,502,599 A | 3/1985 | Perecman | |
| 4,526,562 A * | 7/1985 | Knudsen ................ | B21D 51/46 |
| | | | 493/353 |
| 4,531,668 A | 7/1985 | Forbes, Jr. | |
| 4,574,952 A | 3/1986 | Masui | |
| 4,584,201 A | 4/1986 | Boston | |
| 4,679,693 A | 7/1987 | Forman | |
| 4,738,365 A | 4/1988 | Prater | |
| 4,785,940 A | 11/1988 | Wilson | |
| 4,838,429 A | 6/1989 | Fabisiewicz et al. | |
| 4,846,504 A | 7/1989 | MacGregor et al. | |
| 4,865,793 A * | 9/1989 | Suzuki ................ | B65D 17/401 |
| | | | 425/117 |
| 4,871,265 A | 10/1989 | Peck | |
| 4,913,560 A | 4/1990 | Herrington | |
| 5,007,578 A * | 4/1991 | Simone .................... | B65D 3/28 |
| | | | 206/459.5 |
| 5,012,946 A * | 5/1991 | McCarthy .............. | B65D 51/20 |
| | | | 220/359.3 |
| 5,044,776 A | 9/1991 | Schramer et al. | |
| 5,123,535 A | 6/1992 | Patnode et al. | |
| 5,235,149 A | 8/1993 | Boehrer | |
| 5,246,106 A * | 9/1993 | Johnson ................. | B65D 81/32 |
| | | | 206/217 |
| 5,265,794 A | 11/1993 | Johnston | |
| 5,415,910 A | 5/1995 | Knauf | |
| 5,484,167 A | 1/1996 | Donaldson et al. | |
| 5,507,428 A | 4/1996 | Robinson, Jr. et al. | |
| 5,569,515 A | 10/1996 | Rice, II et al. | |
| 5,571,358 A | 11/1996 | Napier et al. | |
| 5,588,552 A * | 12/1996 | Johnson ............. | B65D 17/4012 |
| | | | 229/404 |
| 5,832,145 A | 11/1998 | Dais et al. | |
| 5,833,368 A | 11/1998 | Kaufman | |
| 5,855,435 A | 1/1999 | Chiesa | |
| 5,871,096 A | 2/1999 | Yakich | |
| 5,902,045 A | 5/1999 | Resteghini | |
| 5,910,348 A | 6/1999 | Hart-Smith et al. | |
| 5,921,065 A * | 7/1999 | Slyster ................... | B43M 3/045 |
| | | | 493/917 |
| 5,947,368 A | 9/1999 | Thresher et al. | |
| 5,958,486 A | 9/1999 | Ringdahl et al. | |
| 5,976,294 A * | 11/1999 | Fagnant .................. | B31D 1/02 |
| | | | 156/227 |
| 5,979,748 A | 11/1999 | Drummond et al. | |
| 6,026,853 A | 2/2000 | Osterbrink | |
| 6,026,953 A | 2/2000 | Nakamura et al. | |
| 6,041,929 A | 3/2000 | Brunner et al. | |
| 6,047,488 A | 4/2000 | Tuskiewicz | |
| 6,056,141 A * | 5/2000 | Navarini ............ | B65D 77/2044 |
| | | | 428/35.8 |
| 6,190,485 B1 | 2/2001 | Cahill et al. | |
| 6,196,450 B1 | 3/2001 | Varadarajan et al. | |
| 6,206,570 B1 | 3/2001 | Cortopassi | |
| 6,234,386 B1 | 5/2001 | Drummond et al. | |
| 6,264,098 B1 | 7/2001 | Drummond et al. | |
| 6,270,004 B1 | 8/2001 | Drummond et al. | |
| 6,302,321 B1 | 10/2001 | Reese et al. | |
| 6,328,203 B1 | 12/2001 | Tedford, Jr. | |
| 6,334,711 B1 | 1/2002 | Risgalla et al. | |
| 6,383,592 B1 | 5/2002 | Lowry et al. | |
| 6,428,867 B1 | 8/2002 | Scott et al. | |
| 6,460,720 B1 | 10/2002 | Massey et al. | |
| 6,497,336 B2 | 12/2002 | Grayer | |
| 6,544,613 B1 | 4/2003 | Varadarajan | |
| 6,558,305 B1 | 5/2003 | Haggman | |
| 6,589,622 B1 | 7/2003 | Scott | |
| 6,620,275 B1 | 9/2003 | Avila et al. | |
| 6,660,353 B2 | 12/2003 | Siedl | |
| 6,746,743 B2 | 1/2004 | Knoerzer et al. | |
| 6,857,561 B2 | 2/2005 | Williams et al. | |
| 6,858,108 B2 | 2/2005 | Matthews et al. | |
| 6,890,112 B2 | 5/2005 | Kline | |
| 6,991,375 B2 | 1/2006 | Clune et al. | |
| 7,144,635 B2 | 12/2006 | Hawes et al. | |
| 7,189,300 B2 | 3/2007 | Knoerzer et al. | |
| 7,228,961 B2 | 6/2007 | Koetter et al. | |
| 7,344,744 B2 | 3/2008 | Sierra-Gomez et al. | |
| 7,416,768 B2 | 8/2008 | Knoerzer et al. | |
| 7,422,782 B2 | 9/2008 | Haedt et al. | |
| 7,608,317 B2 | 10/2009 | Keckeisen et al. | |
| 7,686,513 B2 | 3/2010 | Knoerzer et al. | |
| 7,717,620 B2 | 5/2010 | Hebert et al. | |
| 7,789,236 B2 | 9/2010 | Burgess | |
| 7,789,262 B2 * | 9/2010 | Niederer ............ | B65D 77/2032 |
| | | | 229/123.1 |
| 7,828,923 B2 | 11/2010 | Patel | |
| 7,955,678 B2 | 6/2011 | Stogbauer et al. | |
| 8,051,979 B2 | 11/2011 | Smith et al. | |
| 8,408,451 B2 | 4/2013 | Adam et al. | |
| 8,443,578 B2 | 5/2013 | Sargin et al. | |

(56) References Cited

U.S. PATENT DOCUMENTS

| | | | |
|---|---|---|---|
| 8,544,718 B2 | 10/2013 | Yamato et al. | |
| 8,646,975 B2 | 2/2014 | Moehlenbrock et al. | |
| 8,740,052 B2* | 6/2014 | Drummond | B65D 77/2032 |
| | | | 229/123.1 |
| 8,746,490 B2 | 6/2014 | Huffer et al. | |
| 9,096,346 B2* | 8/2015 | Huffer | B65D 77/2056 |
| 9,278,506 B2* | 3/2016 | McLean | B65D 17/4012 |
| 9,783,354 B2 | 10/2017 | Rhue | |
| 9,802,746 B2 | 10/2017 | Rhue | |
| 9,850,056 B2* | 12/2017 | Shaw | B65D 81/3446 |
| 9,928,757 B2 | 3/2018 | Huffer et al. | |
| 10,026,339 B2 | 7/2018 | Huffer et al. | |
| 10,138,026 B2 | 11/2018 | Branyon | |
| 10,150,600 B2 | 12/2018 | Huffer | |
| 10,442,573 B1* | 10/2019 | Battat | B65D 3/10 |
| 10,499,667 B2* | 12/2019 | Milligan | B65D 81/266 |
| 2003/0135409 A1* | 7/2003 | Romano | G06Q 30/0277 |
| | | | 40/307 |
| 2003/0178429 A1 | 9/2003 | Williams et al. | |
| 2004/0013827 A1 | 1/2004 | Zuser et al. | |
| 2004/0064983 A1 | 4/2004 | Joseph | |
| 2004/0079763 A1 | 4/2004 | Powell et al. | |
| 2005/0031814 A1 | 2/2005 | Dawes | |
| 2005/0078890 A1 | 4/2005 | Abe et al. | |
| 2005/0109652 A1 | 5/2005 | Goepfert | |
| 2005/0153113 A1 | 7/2005 | Hseih et al. | |
| 2005/0247713 A1* | 11/2005 | Niederer | B65D 77/2032 |
| | | | 220/359.2 |
| 2005/0276525 A1 | 12/2005 | Hebert et al. | |
| 2006/0138207 A1 | 6/2006 | Levine et al. | |
| 2006/0147129 A1 | 7/2006 | Miller | |
| 2006/0180593 A1* | 8/2006 | White | A47G 21/182 |
| | | | 220/705 |
| 2006/0198986 A1 | 9/2006 | Keckeisen et al. | |
| 2007/0051790 A1 | 3/2007 | Smith et al. | |
| 2008/0037911 A1 | 2/2008 | Cole et al. | |
| 2008/0044114 A1 | 2/2008 | Hall et al. | |
| 2008/0073308 A1 | 3/2008 | Yousif | |
| 2008/0075897 A1* | 3/2008 | Keckeisen | B32B 27/08 |
| | | | 428/29 |
| 2008/0190937 A1 | 8/2008 | Cho | |
| 2008/0240627 A1 | 10/2008 | Cole et al. | |
| 2008/0272016 A1 | 11/2008 | Anderson et al. | |
| 2009/0078671 A1 | 3/2009 | Triquet et al. | |
| 2009/0194451 A1 | 8/2009 | Leiner et al. | |
| 2009/0226117 A1 | 9/2009 | Davis et al. | |
| 2009/0274799 A1 | 11/2009 | Lee et al. | |
| 2010/0019022 A1 | 1/2010 | Ryan et al. | |
| 2010/0098355 A1 | 4/2010 | Jansen | |
| 2010/0111453 A1 | 5/2010 | Dierl | |
| 2010/0147724 A1 | 6/2010 | Mitra-Shah et al. | |
| 2010/0288760 A1 | 11/2010 | McGrew et al. | |
| 2010/0323134 A1 | 12/2010 | Bostian et al. | |
| 2011/0038569 A1 | 2/2011 | Huffer et al. | |
| 2011/0049168 A1 | 3/2011 | Loftin | |
| 2011/0089177 A1 | 4/2011 | Thorstensen-Wolf | |
| 2011/0186619 A1* | 8/2011 | Moresi | B31B 50/81 |
| | | | 493/227 |
| 2011/0204056 A1 | 8/2011 | Veternik et al. | |
| 2012/0082764 A1 | 4/2012 | Paterson | |
| 2012/0125932 A1 | 5/2012 | Sierra-Gomez et al. | |
| 2012/0177307 A1 | 7/2012 | Duan et al. | |
| 2012/0314979 A1 | 12/2012 | Heininga | |
| 2013/0011527 A1 | 1/2013 | Renders et al. | |
| 2013/0026170 A1 | 1/2013 | Zerfas et al. | |
| 2013/0056470 A1 | 3/2013 | Hallak | |
| 2013/0089280 A1 | 4/2013 | Tseng et al. | |
| 2013/0101239 A1 | 4/2013 | Kropf et al. | |
| 2013/0114918 A1 | 5/2013 | Lyzenga et al. | |
| 2013/0121624 A1 | 5/2013 | Lyzenga et al. | |
| 2013/0279832 A1 | 10/2013 | Burri et al. | |
| 2013/0320019 A1 | 12/2013 | Tinoco et al. | |
| 2014/0000219 A1 | 1/2014 | Pezzoli | |
| 2014/0079343 A1 | 3/2014 | Lyzenga et al. | |
| 2014/0270597 A1 | 9/2014 | Friedman et al. | |
| 2014/0363545 A1 | 12/2014 | Veternik et al. | |
| 2014/0376836 A1 | 12/2014 | Schieber | |
| 2015/0158643 A1 | 6/2015 | Coker et al. | |
| 2015/0239615 A1* | 8/2015 | O'Donnell | B32B 38/0032 |
| | | | 156/77 |
| 2015/0297005 A1 | 10/2015 | Janor | |
| 2015/0353238 A1 | 12/2015 | Moehlenbrock et al. | |
| 2016/0009447 A1* | 1/2016 | Rhue | B65D 3/22 |
| | | | 493/52 |
| 2016/0096667 A1 | 4/2016 | Huffer | |
| 2016/0122109 A1 | 5/2016 | Clark et al. | |
| 2016/0130041 A1 | 5/2016 | Giorgio et al. | |
| 2016/0167680 A1 | 7/2016 | Tomsovic et al. | |
| 2016/0227835 A1 | 8/2016 | Swede | |
| 2016/0236844 A1 | 8/2016 | Gagne et al. | |
| 2016/0288960 A1* | 10/2016 | Branyon | B65D 77/14 |
| 2016/0343275 A1* | 11/2016 | Huffer | B32B 27/08 |
| 2017/0121086 A1 | 5/2017 | Hartley | |
| 2017/0121088 A1 | 5/2017 | Rhue | |
| 2017/0239915 A1* | 8/2017 | Tracy | B65D 65/42 |
| 2017/0283149 A1 | 10/2017 | Rhue | |
| 2017/0345344 A1 | 11/2017 | Huffer et al. | |
| 2018/0244452 A1* | 8/2018 | Huffer | B65D 65/14 |
| 2018/0293918 A1 | 10/2018 | Huffer et al. | |
| 2019/0023452 A1* | 1/2019 | Huffer | B32B 15/085 |
| 2019/0135484 A1* | 5/2019 | Huffer | B32B 37/0076 |
| 2021/0269681 A1* | 9/2021 | Amino | B32B 7/06 |
| 2023/0019398 A1* | 1/2023 | Doster | B65D 41/18 |

FOREIGN PATENT DOCUMENTS

| | | |
|---|---|---|
| DE | 8903067 | 7/1989 |
| EP | 0 488 967 A1 | 6/1992 |
| EP | 0499647 B1 | 1/1995 |
| EP | 0952087 A2 | 10/1999 |
| EP | 1080874 | 3/2001 |
| EP | 1477408 A1 | 11/2004 |
| EP | 1537990 A2 | 6/2005 |
| EP | 1770025 A2 | 4/2009 |
| FR | 1514374 A | 2/1968 |
| FR | 2463468 B1 | 8/1980 |
| FR | 2 463 468 A1 | 2/1981 |
| GB | 2147564 A | 5/1985 |
| GB | 2491646 A | 12/2012 |
| JP | 2000 203654 A | 7/2000 |
| JP | 2013147269 A * | 8/2013 |
| KR | 20140103638 A | 8/2014 |
| WO | WO 95/29097 A1 | 11/1995 |
| WO | WO 96/25333 A1 | 8/1996 |
| WO | WO 98/28728 A1 | 7/1998 |
| WO | WO 03/062090 A1 | 7/2003 |
| WO | WO 2006/093898 A1 | 9/2006 |
| WO | WO 2006/132761 A2 | 12/2006 |
| WO | WO 2008/086389 A2 | 7/2008 |
| WO | WO 2011/158014 | 12/2011 |
| WO | WO 2011158014 A1 | 12/2011 |
| WO | WO 2012/036765 A1 | 3/2012 |
| WO | WO 2014/186571 A2 | 11/2014 |
| WO | WO 2015/009658 A2 | 1/2015 |

OTHER PUBLICATIONS

Canadian Exam Report for Application No. 2925682, dated Aug. 25, 2022, 4 pages.

"Tamper-evidence: Consumers have come to expect tamper-evidence for drugs, foods"; Packaging (Boston, Mass); Mar. 19, 1989; vol. 34, No. 5 (3 pgs.).

"Innovations for opening and closing"; Food Trade Review; Oct. 1993; vol. 63, No. 4 (3 pgs.).

Kate Bertrand; "Improve security through packaging: emerging technologies can help create a package that safeguards products from tampering and protects your brand from counterfeiting"; Food Processing; Feb. 2006; vol. 67, No. 2 (5 pgs.).

U.S. Appl. No. 15/442,779, entitled "Resealable Flexible Packaging", filed Feb. 27, 2017.

U.S. Appl. No. 15/656,481, entitled "Tamper Evident Hybrid Reseal-

(56) References Cited

OTHER PUBLICATIONS able Container", filed Jul. 21, 2017.
U.S. Appl. No. 15/676,167, entitled "Flexible Laminate for Packaging with Integrated Peelable Portion", filed Aug. 14, 2017.
LPS Industries, Loc n Press Pressure Sensitive Zippered Envelopes, www.lpsind.com, accessed Apr. 1, 2015.
ITC, Custom Adhesive Tape Manufacturing & Design, www.itctapes.com, accessed Feb. 2, 2015.
Clearbags, Value Crystal Clear Bags, www.clearbags.com, accessed Apr. 1, 2015.
International Search Report and Written Opinion of the International Searching Authority for International Application No. PCT/US2018/054170 mailed Dec. 6, 2018.
Extended European Search Report for Application No. 18174641.3 dated Sep. 10, 2018; all pages.
Non-Final Office Action for U.S. Appl. No. 15/442,779 dated Oct. 8, 2019.
European Examination Report for European Patent Application No. 18174601.7 dated Oct. 9, 2019.
Final Office Action for U.S. Appl. No. 14/928,489 dated Mar. 22, 2018.
International Search Report and Written Opinion of the International Searching Authority for International Application No. PCT/US2017/064594 mailed Mar. 27, 2018.
Non-final Office Action for U.S. Appl. No. 14/676,390 dated Apr. 27, 2018.
Non-final Office Action for U.S. Appl. No. 14/871,398 dated May 2, 2018.
Non-Final Office Action for U.S. Appl. No. 17/331,982 dated Sep. 22, 2022.
Jul. 26, 2018 Extended European Search Report issued in European Patent Application No. 18174601.7.
Jul. 28, 2016 Extended European Search Report issued in European Patent Application No. 16165679.8.
Jan. 11, 2017 Office Action issued in Canadian Patent Application No. 2,927,049.
Jul. 19, 2016 Office Action issued in European Patent Application No. 15 175 851.3.
Nov. 11, 2015 Search Report issued in European Patent Application No. 15 175 851.3.
Jun. 14, 2016 Office Action issued in U.S. Appl. No. 14/328,305.
Sep. 8, 2016 Office Action issued in U.S. Appl. No. 14/328,305.
Nov. 8, 2016 Office Action issued in Chinese Patent Application No. 201510402006.6.
Mar. 29, 2017 Office Action issued in Chinese Patent Application No. 201510402006.6.
Nov. 25, 2016 Notice of Allowance issued in U.S. Appl. No. 14/328,305.
Apr. 19, 2017 Office Action issued in U.S. Appl. No. 15/408,620.
Jun. 6, 2017 Notice of Allowance issued in U.S. Appl. No. 15/408,620.
Oct. 9, 2019 Examination Report issued in European Patent Application No. 18174601.7.
Jul. 11, 2016 Search Report issued in European Patent Application No. 16163438.1.
May 1, 2020 Notice of Allowance issued in U.S. Appl. No. 16/008,513.
Oct. 1, 2018 Notice of Allowance issued in U.S. Appl. No. 14/871,398.
Apr. 30, 2020 Office Action issued in U.S. Appl. No. 15/442,779.
Mar. 10, 2020 Office Action issued in U.S. Appl. No. 15/807,200.
Jan. 24, 2018 Office Action issued in Canadian Patent Application No. 2,963,215.
U.S. Appl. No. 15/807,200 entitled "Membrane Lid With Integrated Peelable Portion" filed Nov. 8, 2017.
Mar. 10, 2021 European Communication pursuant to Article 94(3) for EP Application No. 18174601.7.
Apr. 8, 2022 European Communication pursuant to Article 94(3) for EP Application No. 18174601.7.
U. S. Non Final Office Action in U.S. Appl. No. 17/523,282 dated Aug. 3, 2023, 20 pages.

* cited by examiner

MEMBRANE LID WITH INTEGRATED PEELABLE PORTION

CROSS-REFERENCE TO RELATED APPLICATION

This application is a continuation of U.S. application Ser. No. 15/807,200, filed on Nov. 8, 2017, entitled "MEMBRANE LID WITH INTEGRATED PEELABLE PORTION", which is incorporated herein in its entirety.

FIELD OF THE INVENTION

The present invention relates generally to membrane peelable lids with integrated peelable coupons, promotional game pieces, or product information, containers comprising such membrane lids, and methods for making the same.

SUMMARY OF THE INVENTION

In an embodiment, the invention is directed to a flexible membrane lid for a container comprising a top paper layer which is perforated to form a perimeter of at least one peelable portion and a bottom film layer which is partially adhered to the top paper layer, wherein the layers are not adhered within the perimeter of the peelable portion.

In other embodiments, the invention is directed to a flexible membrane lid for a container comprising a top paper layer which is perforated to form a perimeter of a peelable portion and a bottom film layer which is adhered to the top paper layer, wherein the layers are adhered with a pressure sensitive adhesive within the perimeter of the peelable portion and with a permanent adhesive in the remainder of the area between the top paper layer and bottom film layer.

In still other embodiments, the invention is directed to a flexible membrane lid for a container comprising a top paper layer comprising a pull tab and a bottom film layer which is removably adhered to the top paper layer, wherein bottom film layer comprises a separate pull tab.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
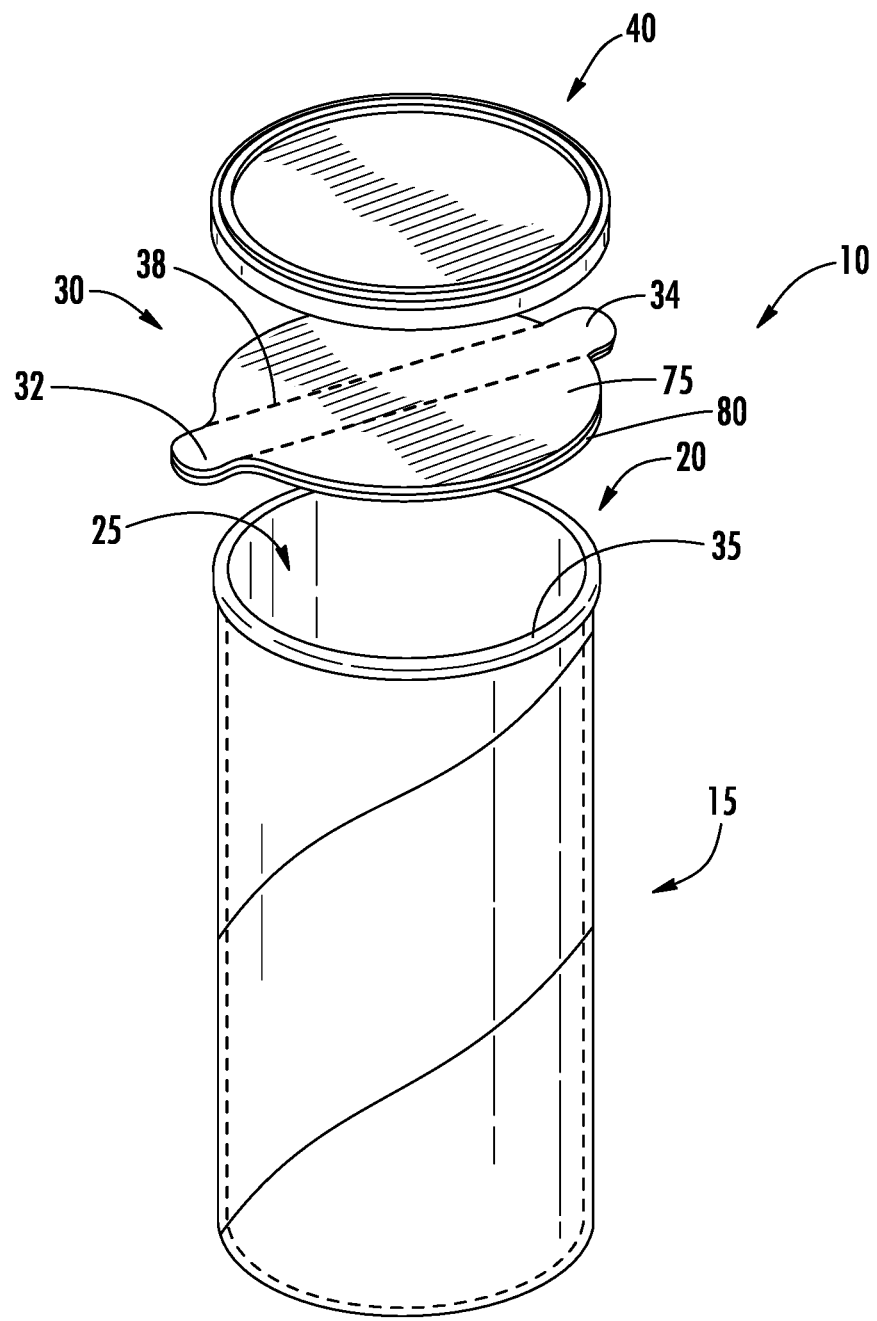
FIG. 1 is an exploded view of a composite container with an overcap in accordance with one embodiment of the invention.

Repeat use of reference characters in the present specification and drawings is intended to represent the same or analogous features or elements of the invention.

DETAILED DESCRIPTION OF PREFERRED EMBODIMENTS

Reference will now be made in detail to embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Food and drink products, such as coffee, spices, sugar, snacks (e.g., stacked chips), as well as non-food items, such as powders, cleaners, and garden products are often packaged in composite containers that are sealed at both ends. A peelable membrane may be used at one of the ends to provide a consumer with access to the products contained inside. In many cases, the peelable membrane is peeled back and/or removed from the composite container by the user through use of a tab that is continuous with the membrane. The tab is pulled up or back to peel the membrane away from the rim of the container, revealing the container contents.

In the present invention, the membrane lid has a tab which enables a consumer to grasp and peel the membrane lid away from the container. In an embodiment, the membrane lid additionally has at least a second, separate tab (or otherwise integrated coupon, game promotion or product information) which enables the consumer to grasp and peel a separate portion away from the membrane lid without disturbing the seal of the membrane lid on the container. Generally speaking, the membrane lid may have a top paper layer which is perforated or scored, forming a perimeter of at least one peelable portion, optionally near the location of a second tab. Multiple peelable portions are possible. In some embodiments, the peelable portion may have a slit within which a consumer may insert a finger or other object to lift and remove the peelable portion. An adhesive may be pattern applied, or an adhesive deadener/knockout may be used, to create an adhesive-free zone between the top paper layer and a metallized film layer in the location of the peelable portion. In other words, there may be an adhesive layer between the top paper layer and a flexible film layer such that the layers are adhered together, other than in the adhesive-free zone. The adhesive-free zone, in an embodiment, is located between the top paper layer and a metallized film layer, in the location of the second tab, label, coupon, and/or promotion. In an embodiment, the film layer is adhered on its bottom side to a composite container.

In use, the second tab may be grasped by the consumer and pulled, breaking optional scoring or perforations adjacent the peelable portion of the top paper layer. The label, coupon, or promotion may then be peeled away from the membrane lid without disturbing the seal of the membrane lid to the container. Information such as product nutritional information, a product discount or coupon, and/or promotional game results may be printed on the top side of the metallized film layer and/or on the bottom side of the paper layer. The consumer may view the revealed information after the second tab has been grasped and the peelable portion has been peeled back and/or removed.

The membrane lid may comprise a paper layer defining an inner surface, an adhesive layer disposed between the inner surface of the paper layer and the upper surface of a film layer, and a film layer. The film layer may be adhered to a container, on its bottom side, via a membrane sealant.

The top, outermost layer of the membrane lid may comprise a paper, as such is known in the art, but need not be a paper layer. In an embodiment, the top layer may comprise a film layer as is further described herein. In other embodiments, the outermost layer may comprise multiple plies of paper. In an embodiment, the top layer may comprise a bleached kraft paper that is coated on one side with a clay-based coating. In such an embodiment, ink may be printed onto the outer surface of the paper layer by a printing process such as flexo or gravure printing. The top layer may include a material designed to promote barrier properties against moisture and oxygen. An optional overlaquer layer may be applied as the final, outer layer of the membrane, over the top of the paper layer, in order to provide a protective coating over any ink on the paper layer. As will be more fully described herein, this top layer comprises a tab which allows a user to grasp, peel back, and/or remove a label, tag, coupon, promotional piece, or the like.

The adhesive disposed between the paper and film layer may be provided as a separate layer or alternatively, one of the paper or film layer can be provided with an adhesive thereon. Any adhesive known in the art to be used in the lamination of the selected top and bottom layer may be utilized in this invention. In some embodiments, the adhesive can be a urethane adhesive or, polyethylene, such as low density polyethylene (LDPE). The adhesive may be a permanent adhesive or a pressure sensitive adhesive (PSA). Any suitable permanent adhesive or PSA known in the art may be utilized in the present invention. If a PSA is used, it may be a water-based acrylic. For example, the PSA may comprise an acrylic, a natural rubber, a synthetic rubber, a silicone, a butyl, or an ethylenevinylacetate (EVA).

The film layer utilized as part of the membrane lid may comprise any flexible packaging film known in the art, including but not limited to, polymer films, metalized polymer films, papers, metal foils, polyester films, polyolefin films, polyethylene terephthalate (PET), polypropylene, oriented polyimide, nylon film, metalized polyester, any combination thereof, or any other suitable film known in the art. In an embodiment, the film layer may comprise a pre-printed film or label. The film layer may be, for example a metalized polyethylene terephthalate (mPET) film. In other embodiments, film layer may be a metalized oriented polypropylene (mOPP) material. The thickness of the film layer may vary according to the particular environment, but may typically have a thickness of between about 0.0009 inch and 0.001 inch. The film layer may, in an embodiment, comprise any material designed to promote barrier properties against moisture and oxygen. The film layer may comprise one ply or may comprise multiple plies. As will be more fully described herein, the film layer comprises a tab which allows a user to grasp, peel back, and/or remove the membrane lid itself.

As noted, the film layer is secured to the rim of the container through use of a membrane sealant. In an embodiment, the membrane sealant may comprise any adhesive and/or sealant film known in the art to secure membrane lids to containers. In some cases, the membrane sealant may be a polyethylene-based sealant. In other cases, the membrane sealant may comprise an ionomer resin, such as Surlyn®. The membrane sealant may be modified with a polymer material to promote additional adhesion to the selected container to which the laminate is adhered, particularly rigid containers. In addition, when used in the present invention, the membrane sealant may, optionally, have a vacuum-deposited aluminum on one side to create an improved barrier and shiny metallic look.

In an embodiment, the membrane sealant may be between about 1 mil and 2 mil thick. In a particular embodiment, the membrane sealant may be a 1.5 mil thick sealant film. In another embodiment, the membrane sealant may comprise a high barrier film. The high barrier film may have a moisture vapor transmission rate of less than 0.01 g/100 in$^2$/day and an oxygen transmission rate of less than 1.0 cc/100 in$^2$/day, in an embodiment. In another embodiment, the high barrier film may have a moisture vapor transmission rate of less than 0.01 g/100 in$^2$/day and an oxygen transmission rate of less than 0.02 cc/100 in$^2$/day.

In an embodiment, the membrane lid is adhered to a container. Any container known in the art for containing food, drink, or non-food products may be utilized in the present invention. In an embodiment, the container is a composite container. The container may be provided in any shape known in the art (i.e. cylindrical, cubical, rectangular, etc.). In an embodiment, the container is a composite container which is rigid and cylindrically shaped. In an embodiment, the container has a body made of one or more layers of paper (e.g., paperboard). The containers of the invention may include a liner ply on the inner surface of the paperboard body ply, in an embodiment. The liner ply may prevent liquids, such as juices, from leaking out of the container and may also prevents liquids (e.g., moisture) from entering the container and possibly contaminating the product contained therein. In an embodiment, the liner ply is also resistant to the passage of gases, so as to prevent odors of the product in the container from escaping and to prevent atmospheric air from entering the container and spoiling the product. The liner ply may include aluminum foil, which has good barrier properties and also has advantageous strength properties. The liner ply may have one ply or may have multiple plies.

In an embodiment, the composite container may include a tubular body defining a first end and a second end and comprising at least one paperboard body ply having an inner surface and, optionally, a liner ply adhered to the inner surface of the at least one paperboard body ply. The liner ply may comprise metallized oriented polypropylene (mOPP). The first container end may define an opening providing access to an interior of the tubular body and the products held therein. The second end of the tubular body may be closed. A liner sealant may be disposed on an inner surface of the liner ply. Any liner sealant known in the art may be utilized herein. The paperboard body ply and the liner ply may be rolled outwardly to form a rim at the first end of the tubular body. The peelable membrane lid may be adhered to the rim at the first end of the tubular body and may close the tubular body to form the container.

In an embodiment, an overcap may be provided in combination with the membrane lid, to close the container until such time that the consumer wishes to gain access to the product inside.

In an embodiment, the seal between the membrane lid and the container body is such that the product inside the container attains a certain minimum shelf life and the container remains sealed under different environmental conditions (e.g., high altitude and/or varying temperature extremes). In an embodiment, the seal is not so strong that an unreasonable amount of force (e.g., a force that would be found frustrating to apply by the average consumer) would be required to peel the membrane off in the opening of the container.

As described above, embodiments of the invention provide a composite container that is configured to meet health, safety, market, and manufacturing requirements. Traditionally, coupons, promotional game pieces, and product information are formed separately from a container and are then affixed to the package at a later time, perhaps at the time the package is filled. Such solutions, however, are expensive to implement and add complexity to the manufacturing and filling operations. The present invention provides a membrane lid which has an integrated coupon, promotional game piece, product information, or the like. The coupon, promotional game piece, or product information does not need to be formed separated from the membrane lid and affixed to the membrane lid at a later time, saving time and expense, and simplifying the manufacturing process. Because the coupon, promotional game piece, or product information is integral to the membrane lid (i.e. defined by the layers that form the membrane lid as opposed to being a separate structure that is adhered to or otherwise combined with the membrane lid), the cost of separately printing, cutting, and adhering or attaching the coupon, promotional game piece, or product information is avoided, thereby reducing the overall cost and complexity of manufacturing or filling a container.

Figure 2A:
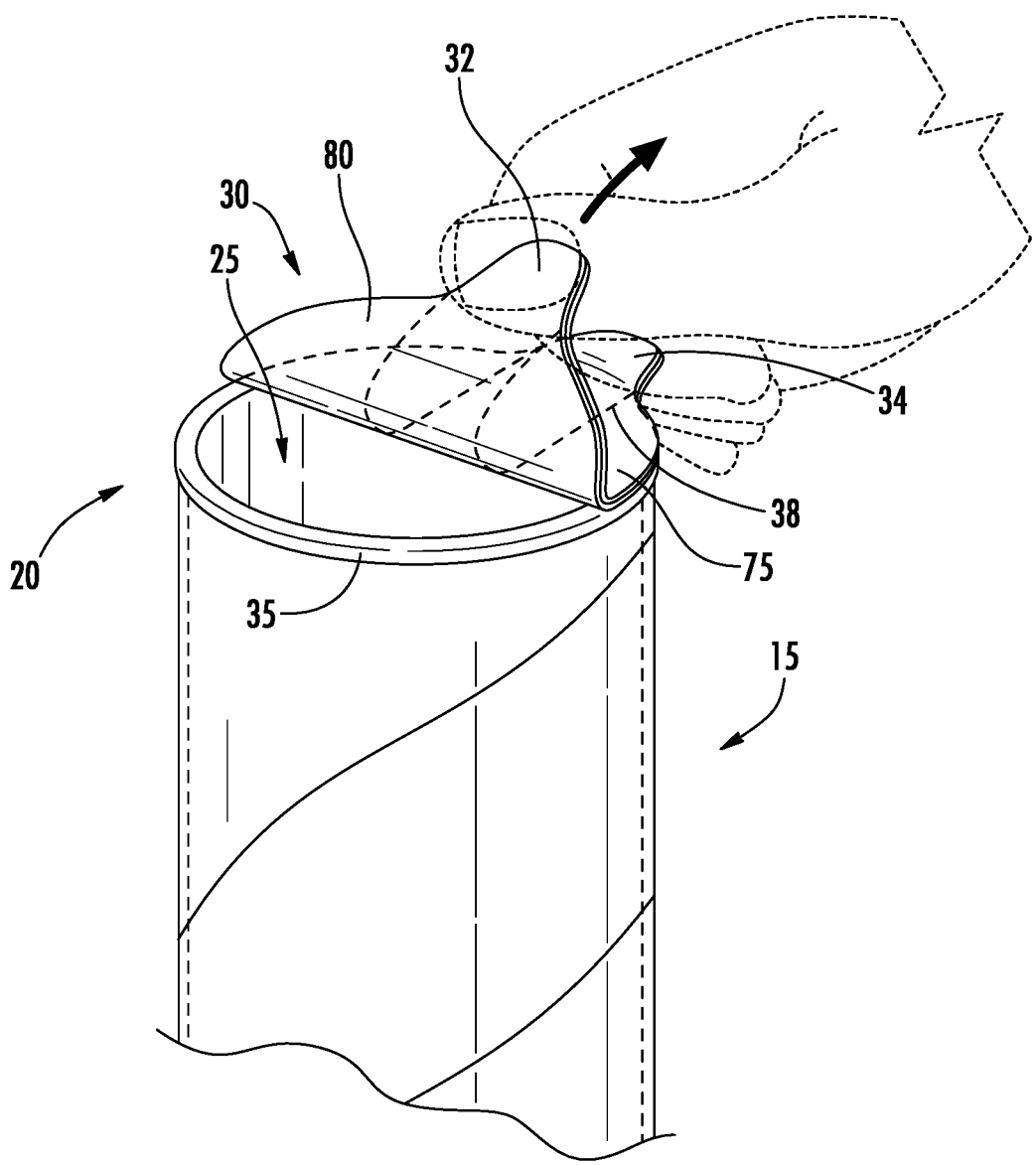
FIG. 2A illustrates the peeling of a membrane lid from the container of FIG. 1 in accordance with an embodiment of the invention.
Figure 2B:
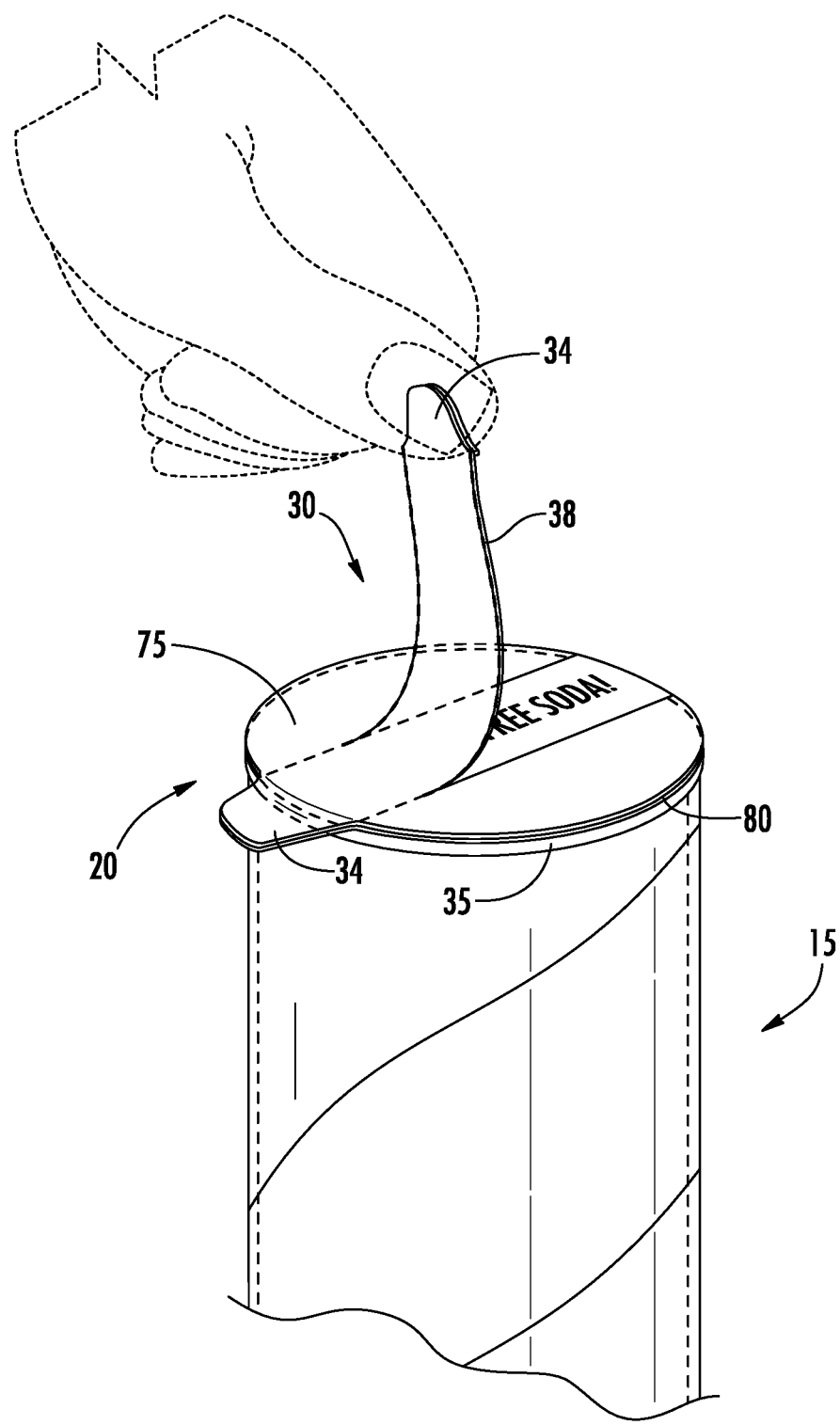
FIG. 2B illustrates the peeling of a promotional tab from the container of FIG. 1 in accordance with an embodiment of the invention.

Referring now to the drawings, in FIG. 1, a composite container 10 is shown according to an embodiment of the invention. The composite container 10 may include a tubular body 15 having a first end 20 that defines an opening 25 providing access to an interior of the tubular body and the products held therein. The container 10 may further include a peelable membrane lid 30 for closing the tubular body 15 to form the container 10. With reference to FIGS. 2A-2B, for example, the tubular body 15 may include a rim 35 at the first end 20, and the peelable membrane lid 30 may be sealed to the rim to close the container 10. FIG.

As shown in FIG. 3, the peelable membrane lid 30 may include multiple layers. For example, in some embodiments, the peelable membrane 30 may include at least one top paper ply 75 and a bottom film layer 80 adhered to the top paper layer 75 ply via an adhesive layer 77.

Figure 5A:
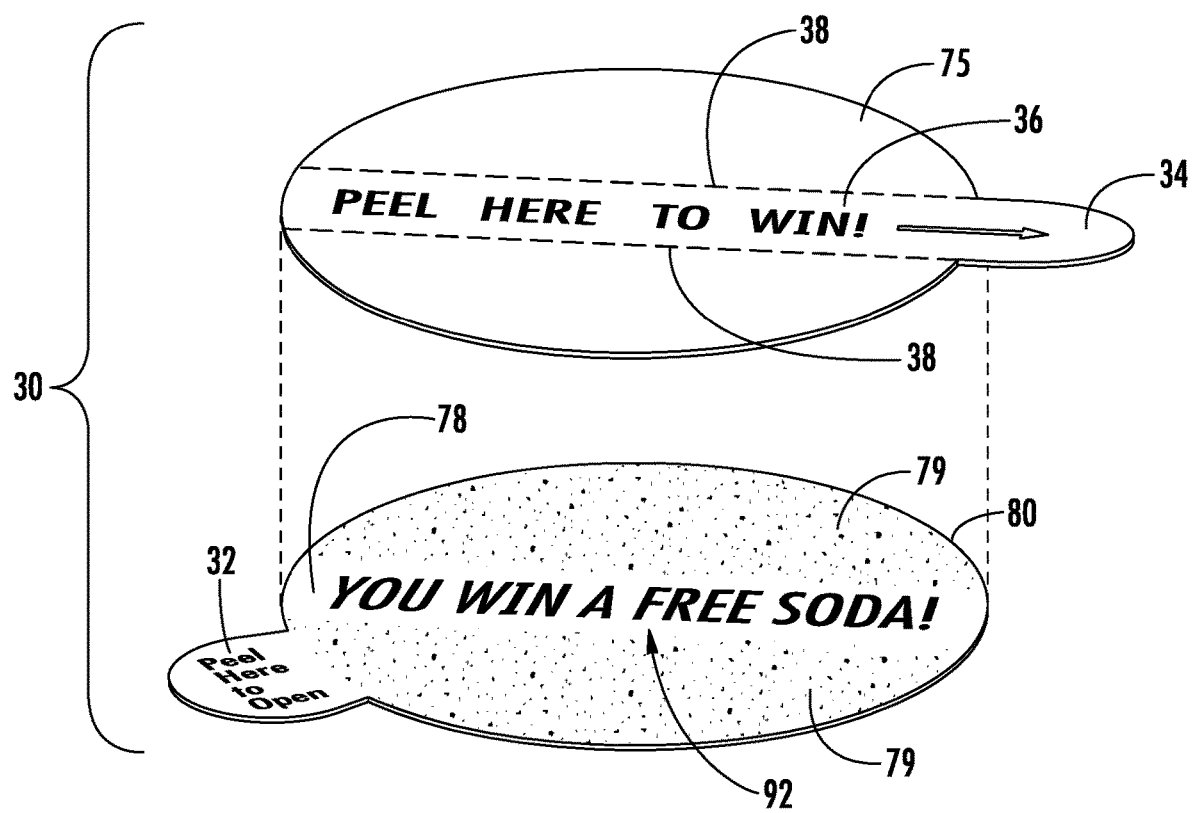
FIGS. 5A-5E are perspective views of a membrane lid in accordance with various embodiments of the invention.
Figure 5B:
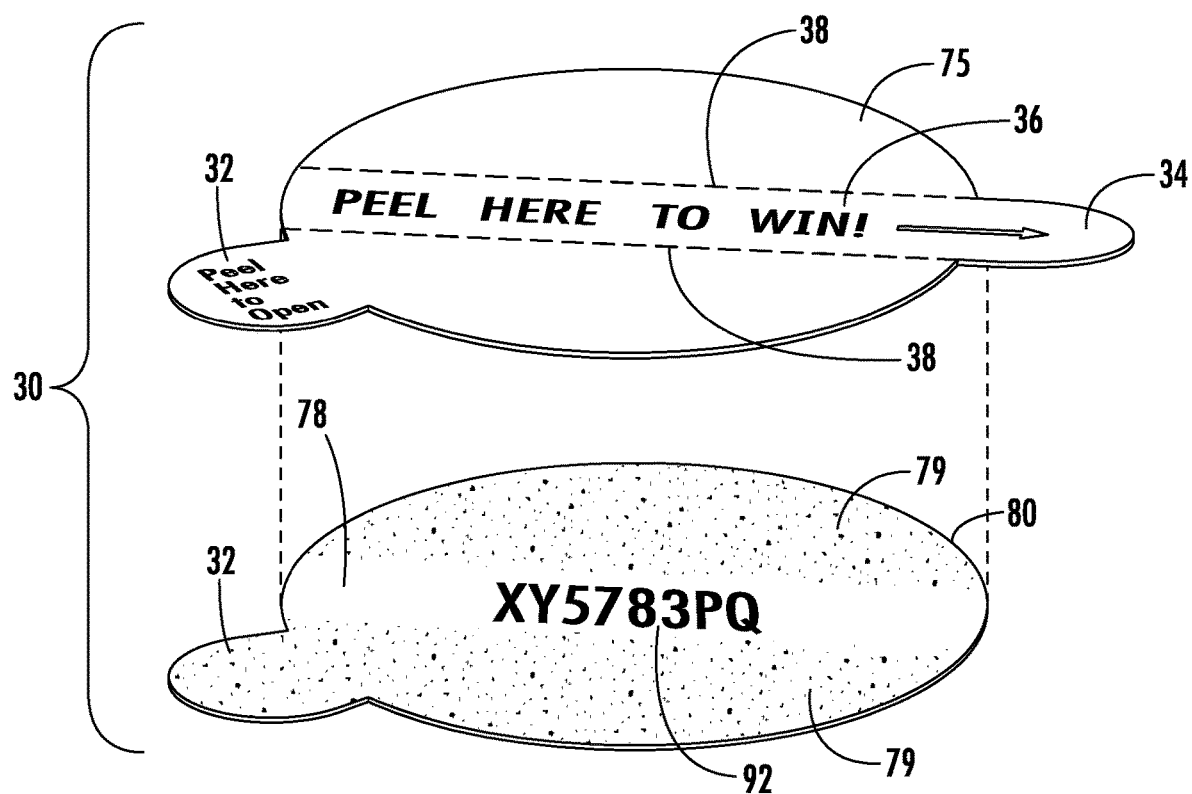

In some embodiments, the peelable membrane lid 30 may include a pull tab 32, which may be a radially extending portion of or protrusion from the peelable membrane 30 that can be grasped by a user, as depicted in FIG. 2A, and used to peel the peelable membrane 30 away from the tubular body 15 to gain access to the contents via the opening 25 that is created. Though pull tab 32 is depicted as extending radially from the membrane, it should be understood the that pull tab 32 could be provided in any manner known in the art. For example, pull tab 32 could extend upwardly from membrane 30 and/or could be any shape known in the art (square, rectangular, semi-circular, etc.). In some embodiments, the pull tab 32 may be continuous with both the top paper layer 75 and the bottom film layer 80 of the membrane 30 (shown in FIG. 2A). That is, each of the paper layer 75 and the film layer 80 may have a co-extensive tab that are permanently adhered together as otherwise is discussed herein. In other embodiments, the pull tab 32 may be continuous with and/or provided on only the bottom film layer 80 (shown in FIG. 5A).

Figure 4A:
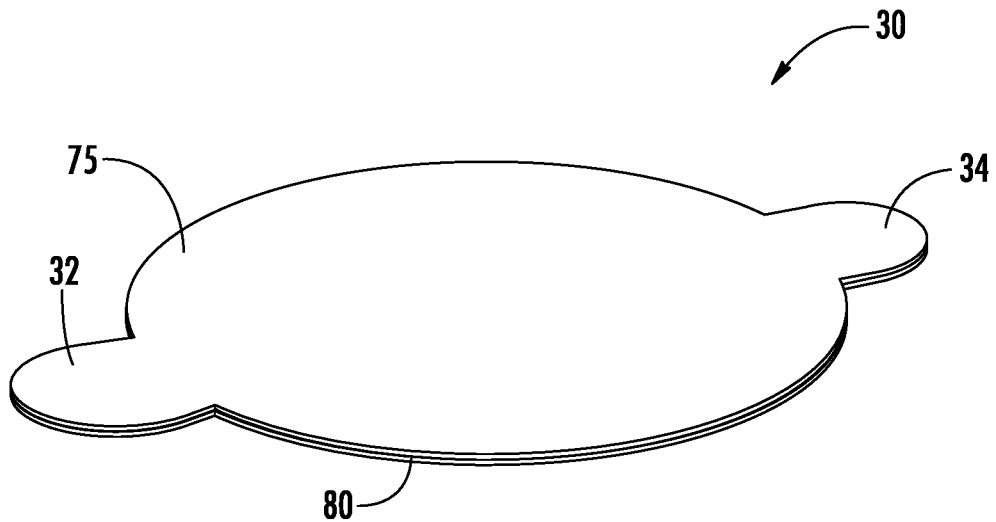
FIGS. 4A-4E are perspective views of a membrane lid in accordance with various embodiments of the invention.
Figure 4B:
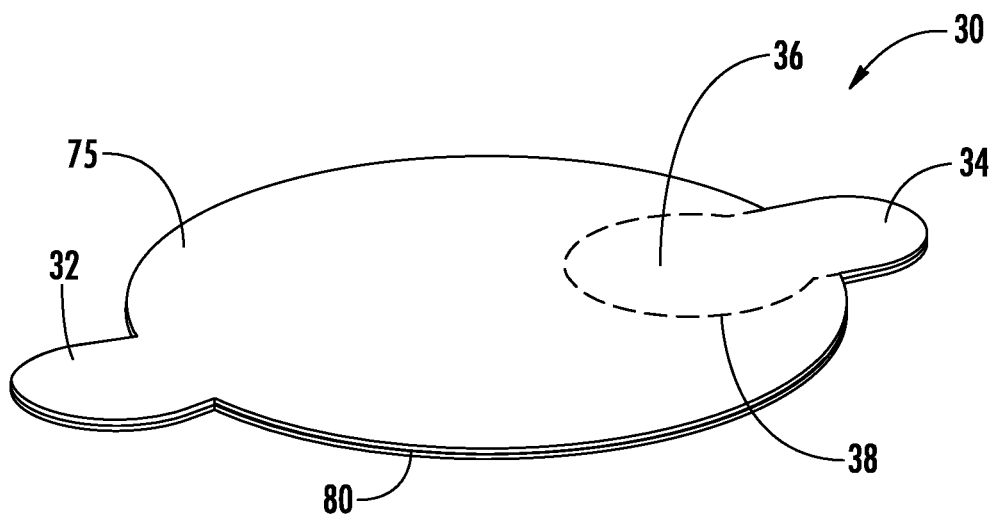

In an embodiment, the peelable membrane lid 30 comprises an integrated peelable label, coupon, promotional piece, product information, or the like (also referred to as a "peelable portion"). In an embodiment, the peelable portion 36 is integrated within the paper layer 75 of the membrane 30. That is, the paper layer 75 may be perforated or scored 38 to form a perimeter around a peelable portion 36. The peelable portion 36 may separatable from the remainder of the paper layer 75 and/or the film layer 80. In another embodiment, the entire paper layer 75 comprises the peelable portion 36 (shown in FIG. 4A). In this embodiment, a PSA may be utilized as the adhesive 77 and may be flooded throughout the region between paper layer 75 and film layer 80.

Figure 5C:
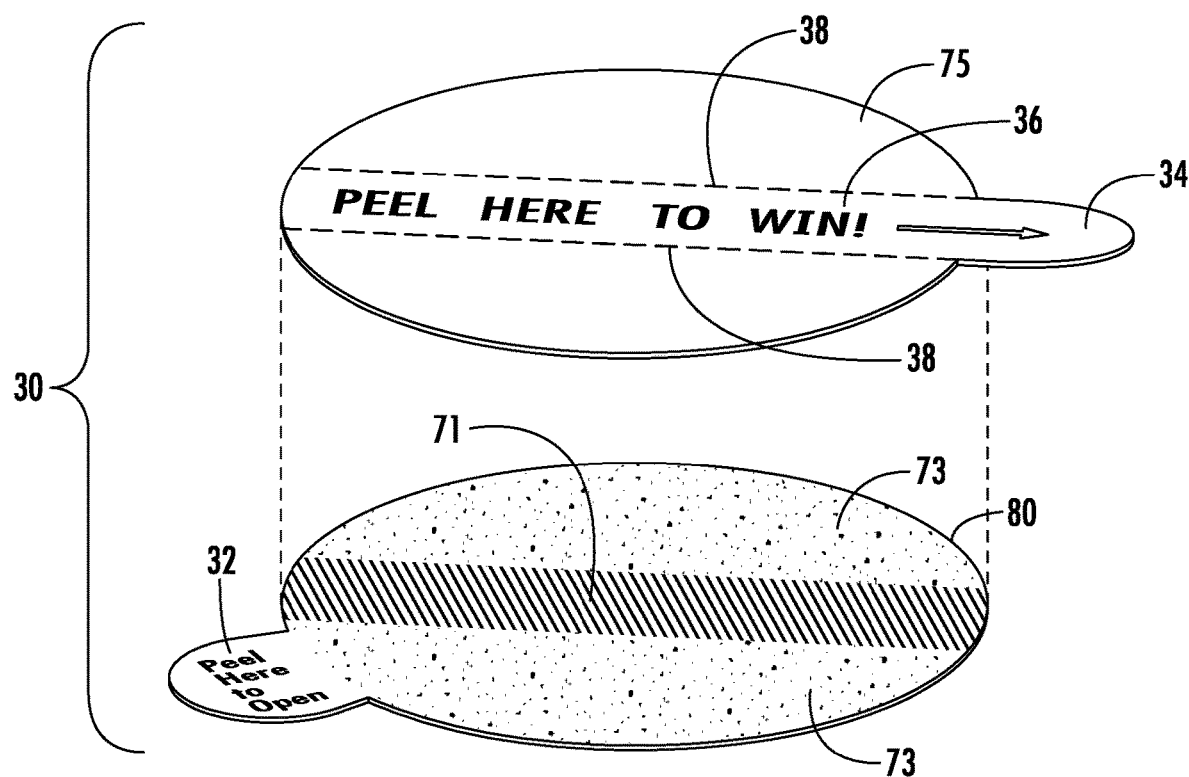
Figure 5D:
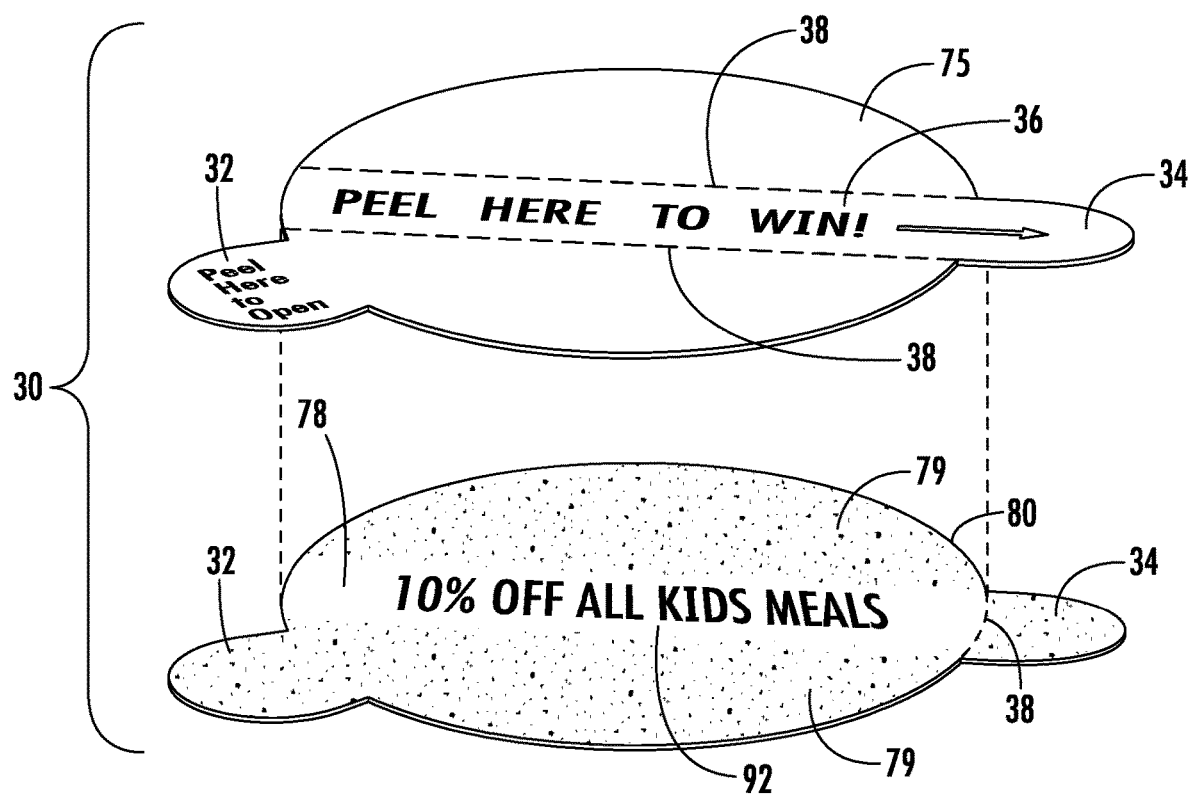
Figure 5E:
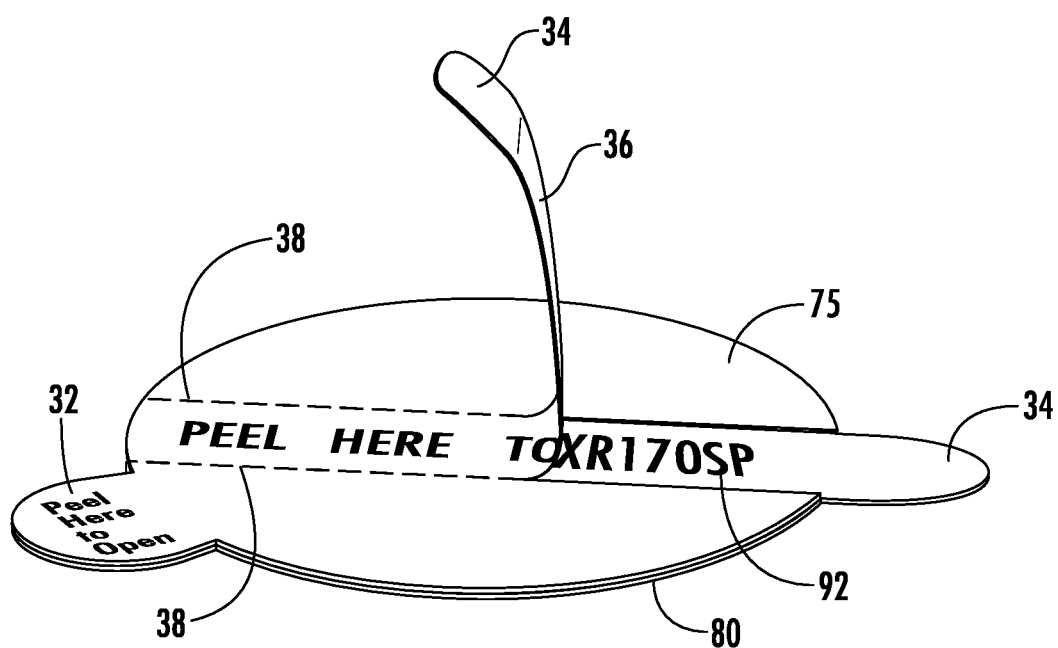

In a particular embodiment, the peelable portion 36 is adhered to the film layer 80 using a PSA 71, but the remainder of paper layer 75 is adhered to film layer 80 using a permanent adhesive 77 (shown in FIG. 5C). In this embodiment, the peelable portion 36 may be separatable and/or removable from the film layer 80 as the user pulls the peelable portion 36 back and the PSA releases, but the remainder of the paper layer 75 will remain adhered to film layer 80. In this embodiment, the permanent adhesive and PSA may be pattern applied such that PSA is positioned in the location of the peelable portion 36 (the PSA zone 71), but permanent adhesive is positioned in all other locations between the layers (the permanent adhesive zone 73). In this embodiment, the PSA may allow re-adherence of the peelable portion 36 to the film layer 80. For example, a consumer may peel back the peelable portion 36 to reveal product information, dosing information, nutritional information, or the like, and may then replace the peelable portion 36 onto the film layer 80 and re-adhere the layers by exerting light pressure on the PSA zone 71.

Figure 4C:
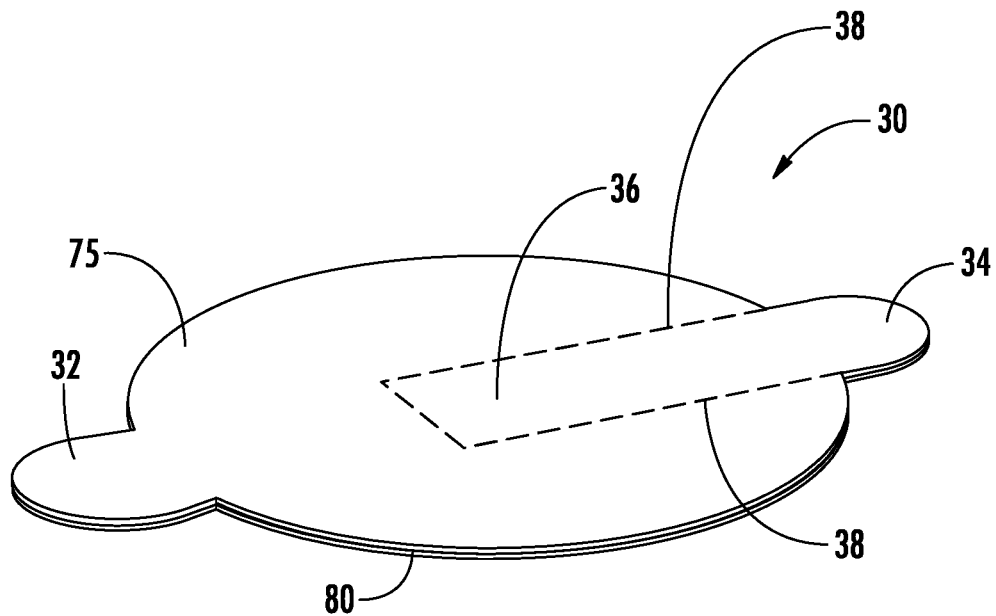
Figure 4D:
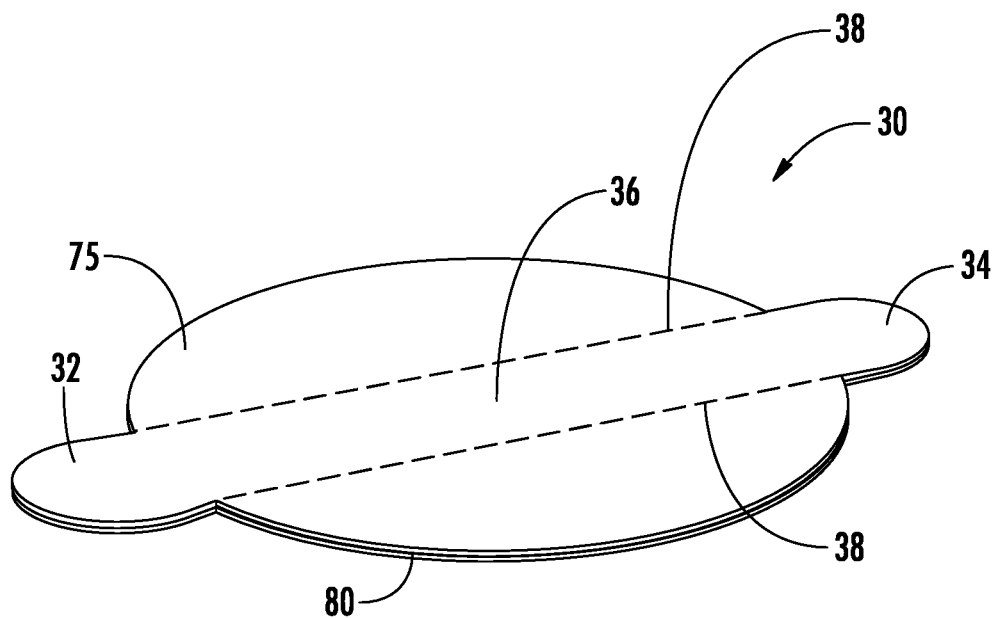
Figure 4E:
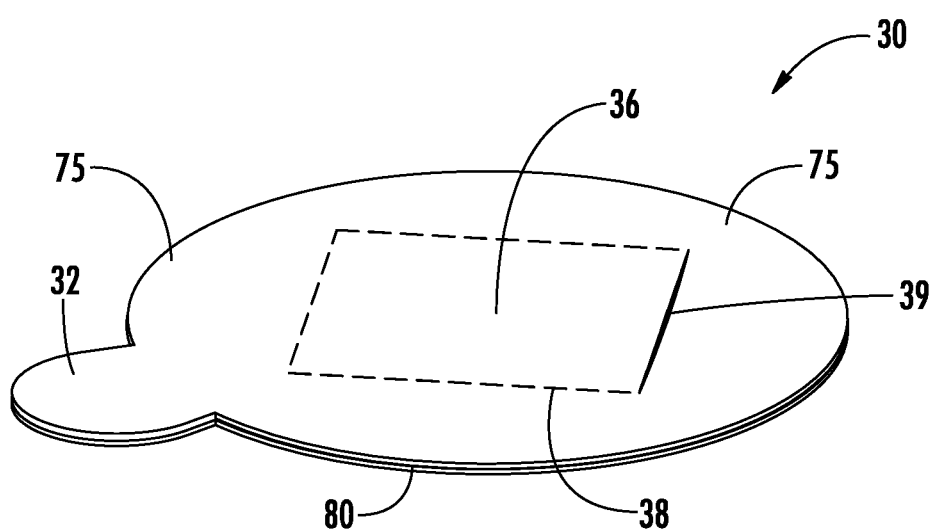

In an embodiment, the perforations 38 surrounding the peelable portion 36 form a particular shape that defines the peelable portion 36. For example, the peelable portion 36 could be a semi-circle, rectangular strip, square, or any other shape known in the art. In an embodiment, the peelable portion 36 is bounded on one side by a cut or slit 39 that is sufficiently sized to allow a consumer to insert a finger or other object, and pull up or back on the peelable portion to remove it from the membrane lid 30 (shown in FIG. 4E).

In another embodiment, the peelable membrane 30 comprises a second pull tab 34. Second pull tab 34 may be a radially extending portion of or protrusion from the peelable membrane 30, but may likewise be contained within the boundaries of the membrane, protruding upwardly or in any other manner that otherwise makes the tab 34 graspable. As noted above, the second pull tab 34 may be positioned adjacent to and continuous with the peelable portion 36. The second pull tab 34 may be continuous with the top paper layer 75 of the membrane 30 and, in some embodiments (shown in FIG. 2B, for example) is continuous with both the top paper layer 75 and the bottom film layer 80. In these embodiments, a perforation or score line 38 may be undercut in film layer 80 between the tab 34 and the remainder of film layer 80 which contacts and seals to the container rim 35 (shown in FIGS. 3A-3B). In some embodiments, the second pull tab 34 is not continuous with the bottom film layer 80.

In an embodiment, the second pull tab 34 may be grasped by a user, as depicted in FIG. 2B, and used to peel the peelable portion 36 away from the film layer 80. However, removal of second pull tab 34 and paper layer 75 would not grant the user access to the container contents because film layer 80 would remain affixed to the container rim 35, protecting the container contents from exposure to the environment. Thus, second pull tab 34, peelable portion 36, and/or paper layer 75 can be removed in whole or in part without disturbing the contents of the container.

In some embodiments, the top paper layer 75 may contain printing, graphics, or ink coloring. In a particular embodiment (shown in FIG. 5), the printing of the paper layer may direct the user to pull second tab 34 or peelable portion 36 for certain purposes (to win a prize, to collect game pieces, to obtain a coupon, etc.). In certain embodiments, tab 32 additionally comprises printing and may direct the user to pull tab 32 to open the container.

In some embodiments, the underside of the peelable portion 36 (i.e. the underside of the paper layer 75 in the location of the peelable portion 36) contains printing which displays graphics, information, discounts, prizes, codes, or the like. In other embodiments, the top side of the film layer 80, in the location of the peelable portion 36, contains such printing 92 (shown in FIGS. 3 and 5). In an embodiment, printing is contained on both the underside of the peelable portion 36 and the top side of the film layer 80, in the location of the peelable portion 36. In an embodiment, the printing 92 may provide product information, such as nutritional information, prize information, such as the prize won, or may comprise a coupon that can be used toward the purchase of the product or another product. In an embodiment, the printed information 92 may not be readable, viewable, or otherwise accessible until the peelable portion 36 is peeled back and/or removed from the membrane lid 30.

As noted above, the paper layer 75 and the film layer 80 of the membrane may be adhered together in certain areas. The adhesive 77 may be applied to the bottom side of the paper layer 75 or may be applied to the top side of film layer 80. In some embodiments, the membrane contains one or more adhesive zones 79 and one or more adhesive-free zones 78 (shown in FIG. 5). The adhesive-free zones 79 may be formed by pattern applying an adhesive and avoiding the adhesive-free zones 78. Alternatively, the adhesive 77 may be flooded or may provide 100% coverage of the membrane 30 between the paper layer 75 and the film layer 80 and then the adhesive may be deadened using any method known in the art.

In an embodiment, the adhesive 77 is pattern applied (or flooded and deadened) to the film layer 80 and the adhesive-free zones 78 are registered to the peelable portion 36 of the paper layer 75 during lamination. Alternatively, the adhesive 77 is pattern applied (or flooded and deadened) to the paper layer 75 to create the adhesive-free zones 78 in the position of the peelable portions 36. In an embodiment, the adhesive-free zone 78 is formed using the methods taught in U.S. patent application Ser. No. 15/442,779 to Huffer, which is incorporated herein by reference in its entirety.

In some embodiments, the peelable portion 36 may be peeled back away from film layer 80 such that the printed information is viewable, but may still remain affixed to film layer 80. In other embodiments, the peelable portion 36 may be removed completely from the membrane 30 after peeling it back from film layer 80.

As noted herein, the membrane lid 30 may be affixed to a container through use of a membrane sealant 85 (FIG. 3). The membrane sealant 85 may be disposed on an inner surface of the membrane 30 (e.g., on an inner surface of the film layer 80). The membrane sealant 85 may be configured to be sealed or otherwise adhered or bonded to the tubular body 15 at a contact region 90 between the membrane 30 and the rim 35. The seal between the membrane sealant 85 and the tubular body 15 may, for example, be the result of heat and/or pressure that is applied to the rim 35.

The tubular body 15 may comprise at least one paperboard body ply, but in some cases, two (or more) plies of paperboard may be spirally wound to form the tubular body 15. Recycled paperboard may, for example, be used in some applications. Moreover, in some cases, a label may be applied to an exterior of the at least one paperboard body ply, such as to provide markings indicating the type of product, brand, manufacturer, ingredients, etc. relating to the product held therein.

A liner ply may be adhered to the inner surface of the paperboard body ply, via an adhesive. In some embodiments, the liner ply may be a multilayer liner structure that includes a paper layer, a low density polyethylene (LDPE) tie layer that holds one or more mOPP film layers to the paper layer, and a liner sealant disposed on an inner surface of the mOPP film layers. The paper layer may be adhered to the inner surface of the at least one paperboard body ply to affix the mOPP liner ply to the paperboard body ply. The mOPP liner ply and the paperboard body ply may be rolled together outwardly (e.g., with respect to the interior of the tubular body 15) to form the rim 35 at the first end 20 of the tubular body 15, as shown.

As noted herein, the membrane lid may be adhered to the container via adherence between the membrane sealant of the lid and the liner sealant of the container body. In an embodiment, upon peeling of the membrane lid from the tubular body to access the products via the opening, the membrane sealant and the liner sealant may remain sealed to each other and cause separation within the mOPP liner ply of the container, to allow the membrane to be removed from the first end of the tubular member. In some cases, the mOPP liner ply may comprise an outer mOPP layer, a core mOPP layer, and an inner mOPP layer. The separation within the mOPP liner ply may, in such cases, occur within the core mOPP layer. The mOPP liner ply may, in some embodiments, comprise a paper layer, a low density polyethylene (LDPE) tie layer, one or more mOPP film layers, and the liner sealant. The paper layer may be adhered to the paperboard body ply to fix the mOPP liner ply to the paperboard body ply. The liner sealant may comprise a metallocene linear low density polyethylene-high density polyethylene (mLLDPE-HDPE) coextrusion. This is more fully described in U.S. patent application Ser. No. 15/408,620 to Rhue, which is incorporated herein by reference in its entirety.

According to certain embodiments of the invention, one or both of the membrane 30 and the tubular body 15 may be configured (e.g., through the selection of materials, the ordering of the layers, the thickness of each layer, the type and/or amount of adhesive used between layers, etc.) such that upon peeling of the membrane 30 from the tubular body 15 to access the products via the opening (as illustrated in FIG. 2A), the membrane sealant 85 separates from the tubular body 15 and allows the membrane 30 to be removed from the first end 20 of the tubular member 15.

In particular, once a threshold amount of force has been applied to the membrane 30 in a peeling direction, a tear may be initiated at the interface between the membrane sealant 85 and the tubular member 15 at one end of the contact region 90. The threshold amount of force may be, for example, between approximately 4 lbs. and 12 lbs. of force, such as approximately 6-10 lbs. of force. In an embodiment, the film layer 80 is underscored near the tab 32, such that the score marks are situated at or near the contact region 90 when the membrane 30 is affixed to the tubular member 15. In an embodiment, the underscoring near tab 32 aids in the splitting, during opening of the container, between film layer 80 and tubular body 15. In an embodiment, multiple underscored parallel/concentric lines may make it easier for the lamination split to occur near the contact region 90 and will make the membrane 30 more tolerant to variations in registration during the lamination process.

In some cases, an overcap 40 may also be provided, as shown in FIG. 1, where the overcap is configured to engage the first end 20 of the tubular body 15 to cover the peelable membrane 30 before the membrane is removed. Once the membrane 30 is peeled away from the first end 20, the overcap 40 may also be used to directly engage the rim 35 of the first end 20 (e.g., via a friction fit) to reclose the container (e.g., if additional product remains inside the tubular body 15 for use at a later date).

Method of Making

A method of manufacturing a container and membrane lid, as described herein, is also provided. Generally speaking, the method of manufacturing the membrane lid may comprise laminating the top paper layer 75 to the film layer 80 using an adhesive 77 and then cutting and scoring the laminate to form the lid 30, the tabs 32, 34 and the peelable portion 36.

Figure 6:
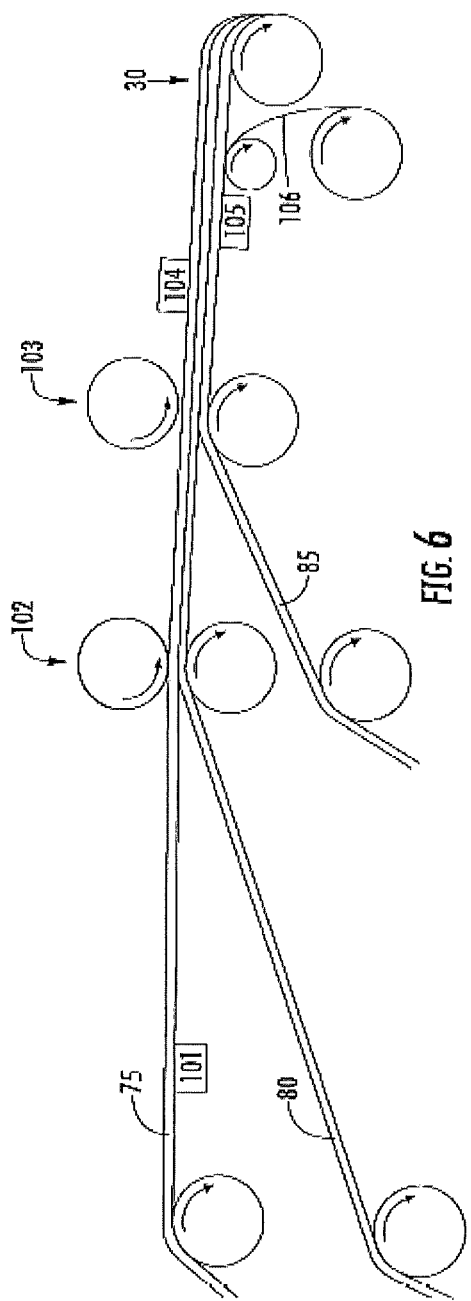
FIG. 6 is a diagram illustrating a method of making a membrane lid in connection with the present invention.

More particularly, as shown in FIG. 6, the paper layer 75 and the film layer 80 may be provided in sheet form. In an embodiment, an adhesive may be pattern applied to the bottom surface of the paper layer 75 in predetermined areas at station 101. In another embodiment, the adhesive is pattern applied to the top side of film layer 80. The adhesive(s) may be applied in any suitable patterns but, in an embodiment, the area between the layers, in the position of the peelable portion 36, is either adhesive-free, deadened, or contains PSA, in various embodiments. In an embodiment, the location(s) of the pull tab(s) also remain adhesive-free. In other embodiments, the locations(s) of the pull tab(s) are permanently adhered to one another. The adhesives may optionally be dried at a drying station such as an oven or the like.

Next, the paper layer 75 and film layer 80 may be adhesively joined via the adhesives (station 102) to form a laminate. This may be accomplished using a laminating machine comprising two rollers forming a nip therebetween, or may be accomplished using any other method known in the art. In an embodiment, the paper layer 75 and film layer 80 should be substantially coextensive with each other during the laminating process. For example, if the paper layer 75 and film layer 80 are rectangular, the width and length of the paper layer 75 should match the width and length of the film layer 80. The membrane lid 30 may be circular, rectangular or any shape suitable for use with the desired container.

Optionally, the membrane sealant 85 may then be applied to the laminated membrane as an additional film lamination (station 103). In this embodiment, for example, a Surlyn® film layer may be adhered to the laminated membrane using a laminating machine comprising two rollers forming a nip therebetween, or may be accomplished using any other method known in the art. In this embodiment, the Surlyn® film layer may be applied to the underside of the film layer 80 and may be adhered using any adhesive known in the art to be useful for such purposes. In another embodiment, optionally, the membrane sealant 85 may be applied to the underside of the film layer 80 as an extrusion coating immediately following the adhesive lamination of the paper layer 75 and the film layer 80.

The laminated membrane may be then fed through a scoring station 104 and top paper layer 75 may be overcut or scored to form one or more of the following: the membrane lid 30, tabs 32, 34, and perforations 38 that define the peelable portion 36 (and/or, optionally, the slit 39). The perforations 38 should extend through the entire thickness or almost the entire thickness of the paper layer 75, but preferably should not extend into the film layer 80. In an embodiment, the perforations 38 are in registration with the perimeter of the PSA zone pattern or adhesive-free zone pattern, as the case may be.

Optionally, the film layer 80 and optional membrane sealant 85 may then (or before or simultaneously with station 104) be precision undercut at station 105 to form diecut 33 (shown in FIG. 3). Diecut 33 may be positioned between tab 34 and the rim 35 of the container body 15. Diecut 33 may extend through the membrane sealant 85, the film layer 80, and the adhesive layer 77. Diecut 33 may be a through cut or may be scores or perforations. Diecut 33 may allow the separation of tab 34 from the remainder of film layer 80, such that the peelable portion 36 can be pulled away from film layer 80 without disturbance of the seal between film layer 80 and the container body 15.

In an embodiment, the membrane lid 30 is cut from the laminate through all layers simultaneously. That is, the perimeter of the lid 30, including the tabs 32, 34, may be cut through all layers of the laminate, simultaneously, after lamination. This embodiment avoids the need for registration of the tabs 32, 34, as they are cut simultaneously. The perimeter of the membrane lid 30 and the tabs 32, 34 may also be cut at station 104, 105, or a different scoring station. Scoring or perforations may be accomplished via die-cutting, laser-cutting, water-cutting, kiss-cutting, or any other method known in the art. The skeleton 106 of the laminate may then be removed and discarded.

The above-noted steps need not occur in this particular order. For example, the scoring of the perforations may be accomplished first and then the adhesive may be applied in registry with the perforations.

In some embodiments, a tubular container body may be formed by spirally winding paperboard ply (e.g., a single ply, two plies, or more) and an optional liner ply, such as by spirally winding continuous strips of the materials around a mandrel of a desired shape (e.g., a cylindrical mandrel) to create the tubular structure. At the downstream end of the mandrel, the tubular structure may be cut into discrete lengths, and the tubular body may be rolled outwardly to form the rim, as described above. The membrane 30, formed above, may then be affixed to the first end of the tubular body 15 by sealing the membrane sealant to the liner sealant using punch-seal-overcapper (PSO) equipment, for example. Each discrete section of the tubular body (representing a container) may be fitted with at least one end cap (e.g., at an end opposite to the first end 20 shown in FIG. 1), although in some applications the tubular bodies may be shipped to a separate facility for application of the end cap.

Although an example method of manufacturing a composite container according to embodiments of the invention is described above, it is understood that the steps of manufacturing the container may vary in some cases. For example, the order in which certain manufacturing steps occurs may vary, and/or in some cases certain steps may be omitted, and others may be added. For example, in some cases, an outer paper label that includes markings identifying the product name, manufacturer, ingredients, etc., as described above, may be applied to the container during the manufacturing process. Likewise, printing 92 of the film layer 80 or the paper layer 75 may occur during the manufacturing process or the layers may be provided pre-printed.

Method of Use

Figure 3A:
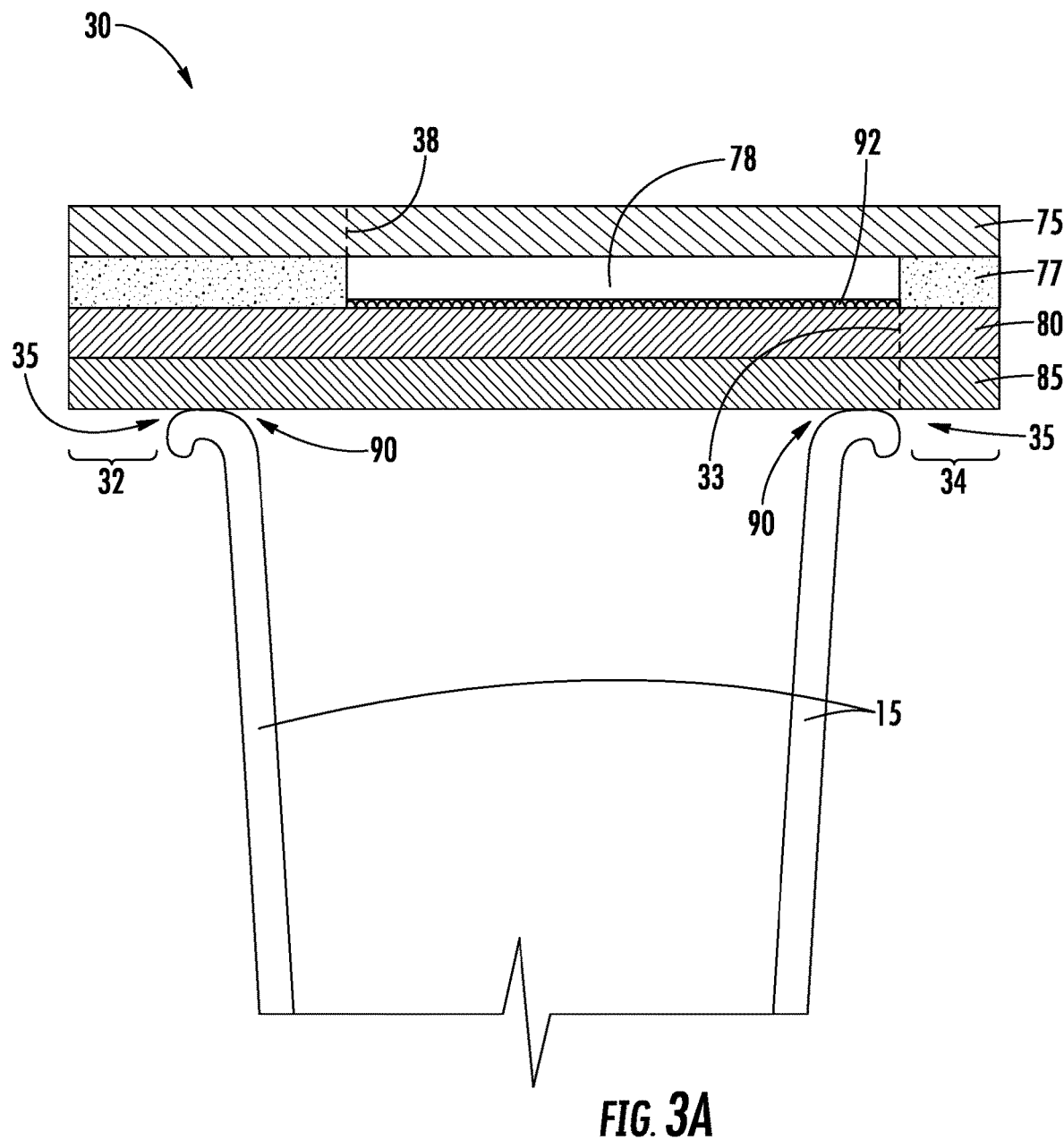
FIG. 3A is a cross-sectional view of an exemplary membrane lid and container of the invention, showing a contact region with the tubular body sealed to the membrane in accordance with an embodiment of the invention.
Figure 3B:
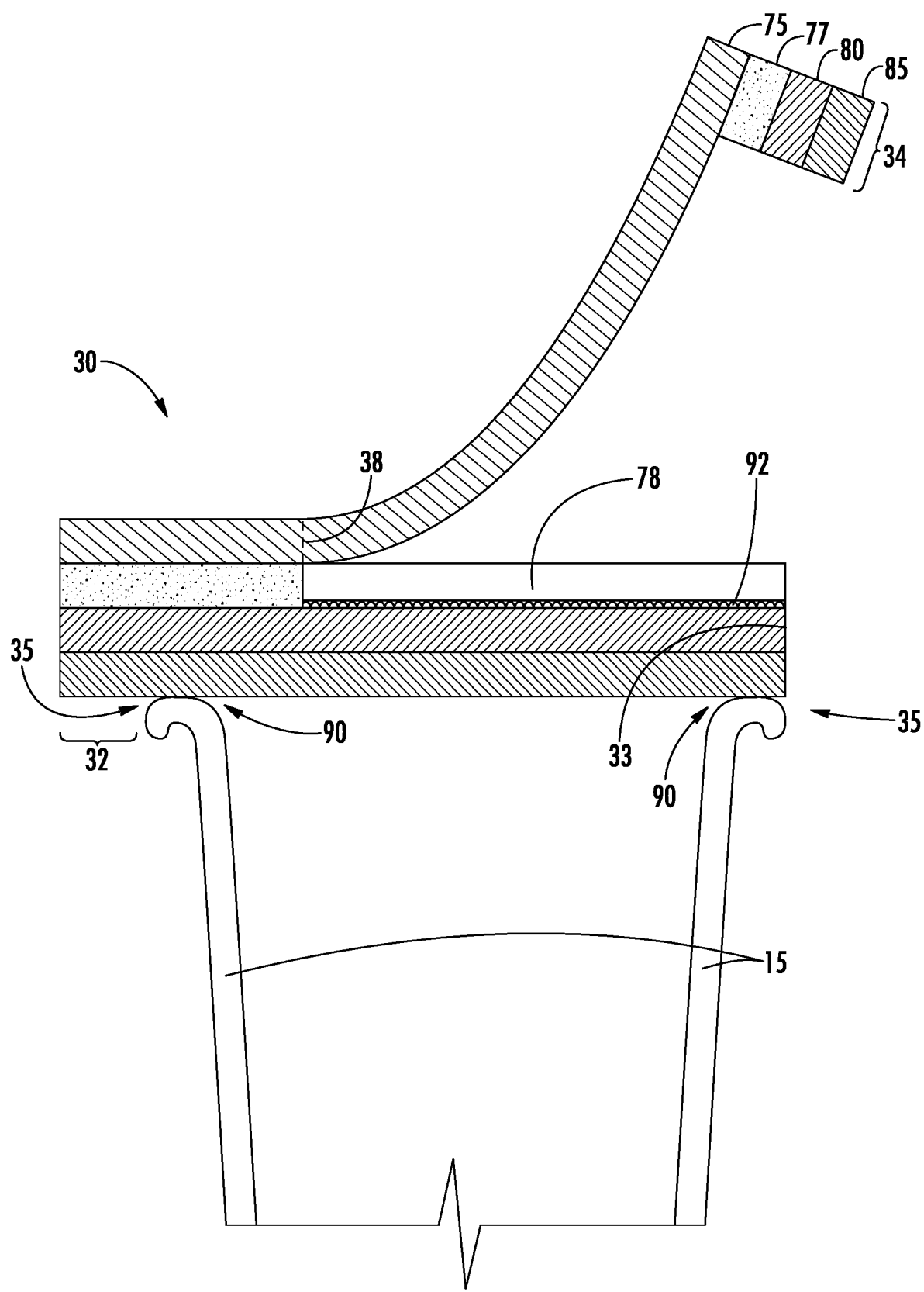
FIG. 3B is a cross-sectional view of an exemplary membrane lid and container of the invention, showing a contact region with the tubular body sealed to the membrane lid in accordance with an embodiment of the invention with a promotional tab peeled away from the membrane lid.

In the embodiment shown in FIG. 3A-3B, tab 32 (used for removal of the membrane lid from the container) is shown on the left and tab 34 (used for removal of the promotional portion) is shown on the right. If the user lifts tab 34 (shown in FIG. 3B), the precision diecuts 33 allow the tab 34 portion of film 80 to separate from the remainder of the film 80 (and optional membrane sealant 85). As shown, tab 34 comprises the film 80 and the paper 75 layers, which are affixed via adhesive 77. Because no adhesive is present in the adhesive-free zone 78, pulling upward on tab 34 will remove the peelable portion 36 of paper layer 75 which is located in the adhesive-free zone 78. The perforations 38 shown in FIG. 3A-3B are optional.

In an embodiment, the peelable portion 36 is separated from the remainder of paper layer 75 by tearing of the perforations 38. In another embodiment, the entire paper layer 75 is removed (shown in FIG. 4A). In still another embodiment, perforations are present on the side edges of the peelable portion 36, but the peelable portion extends the full length of the lid (shown in FIG. 4D). In the embodiment shown in FIG. 4C, the peelable portion 36 may remain affixed to the lid 30 after peeling it back. Alternatively, the peelable portion 36 may be perforated and removed entirely from the lid 30.

On the left side of FIG. 3, tab 32 is shown. Tab 32 is, in this embodiment, continuous with the paper layer 75, the film layer 80, and the optional membrane sealant 85. If a user grasps and pulls upwardly on tab 32, the entire membrane lid 30 can be removed from the rim of the container 15. This can be accomplished separately, before or after the removal of the peelable portion 36 using tab 34.

Moreover, the accompanying figures are provided for explanatory purposes and may not show the different layers, plies, adhesives, labels, inks, and other components described above with respect to embodiments of the container. In addition, those components that are illustrated are not necessarily drawn to scale. Thus, certain layers that are shown as the same thickness or thinner than other layers may actually be thicker than other layers, and so on.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of manufacturing a flexible membrane lid for a container comprising:
   providing a top layer having an upper surface and a lower surface;
   providing a bottom layer having an upper surface and a lower surface and no through holes therein;
   pattern applying an adhesive to the upper surface of the bottom layer or the lower surface of the top layer other than within an adhesive-free zone;
   laminating the top layer to the bottom layer to form a laminate;
   perforating the top layer to form at least one peelable portion which is substantially registered with a perimeter of the adhesive-free zone;
   cutting the laminate to form a membrane lid having a first pull tab and a second pull tab, wherein the first pull tab is continuous with the peelable portion; and
   scoring the bottom layer between the first pull tab and the remainder of the bottom layer.

2. The method of claim 1 additionally comprising printing the lower surface of the top layer within the peelable portion.

3. The method of claim 2 wherein the printing comprises a coupon, discount, prize information, or product information.

4. The method of claim 1 additionally comprising printing the upper surface of the bottom layer within the adhesive-free zone.

5. The method of claim 4 wherein the printing comprises a coupon, discount, prize information, or product information.

6. The method of claim 1 wherein the top layer comprises at least one ply of paper.

7. The method of claim 1 wherein the bottom layer comprises at least one ply of flexible film.

8. The method of claim 1 wherein the cutting step comprise forming the first pull tab and the second pull tab in different locations about the membrane lid.

9. The method of claim 1 wherein the first pull tab and the second pull tab radially extend from the membrane lid.

10. The method of claim 1 comprising perforating the top layer to form a plurality of peelable portions.

11. The method of claim 1 wherein the second pull tab is continuous with the bottom layer.

12. The method of claim 1 wherein perforating the top layer begins at each edge of the first pull tab and extends across the membrane lid to an opposite side of the membrane lid.

13. A method of manufacturing a flexible membrane lid for a container comprising:
   providing a top layer having an upper surface and a lower surface;
   providing a bottom layer having an upper surface and a lower surface;
   pattern applying an adhesive to the upper surface of the bottom layer or the lower surface of the top layer other than within an adhesive-free zone;
   laminating the top layer to the bottom layer to form a laminate;
   scoring the top layer through almost the entire thickness of the top layer to form at least one peelable portion which is substantially registered with a perimeter of the adhesive-free zone;
   cutting the laminate to form a membrane lid having a first pull tab and a second pull tab, wherein the first pull tab is continuous with the peelable portion;
   scoring the bottom layer between the first pull tab and the remainder of the bottom layer;
   affixing the flexible membrane lid to a container; and
   in use, removing all of the at least one peelable portions of the top layer, wherein when all of the at least one peelable portions of the top layer have been removed, any container contents are not exposed to the environment.

14. The method of claim 13 additionally comprising printing the lower surface of the top layer within the peelable portion.

15. The method of claim 14 wherein the printing comprises a coupon, discount, prize information, or product information.

16. The method of claim 13 additionally comprising printing the upper surface of the bottom layer within the adhesive-free zone.

17. The method of claim 16 wherein the printing comprises a coupon, discount, prize information, or product information.

18. The method of claim 13 wherein the top layer comprises at least one ply of paper.

19. The method of claim 13 wherein the bottom layer comprises at least one ply of flexible film.

20. The method of claim 13 wherein the cutting step comprise forming the first pull tab and the second pull tab in different locations about the membrane lid.

\* \* \* \* \*